United States Patent [19]

Blackman

[11] Patent Number: 4,976,048
[45] Date of Patent: Dec. 11, 1990

[54] TAPE MEASURE LOCK

[75] Inventor: William C. Blackman, Raleigh, N.C.

[73] Assignee: Cooper Industries, Inc., Houston, Tex.

[21] Appl. No.: 212,558

[22] Filed: Jun. 28, 1988

[51] Int. Cl.⁵ .............................................. G01B 3/10
[52] U.S. Cl. .................... 33/767; 242/107.2; 242/84.8
[58] Field of Search ............ 33/767; 242/84.8, 107.15, 242/107.2, 107.3, 107.6

[56] References Cited

U.S. PATENT DOCUMENTS

| | | | |
|---|---|---|---|
| 4,131,244 | 12/1978 | Quenot | 33/767 |
| 4,205,448 | 6/1980 | Asai | 33/767 |
| 4,293,058 | 10/1981 | Burton | 33/767 |
| 4,474,340 | 10/1984 | Duda | 242/107.2 |
| 4,578,867 | 4/1986 | Czerwinski et al. | 242/84.8 |
| 4,663,854 | 5/1987 | Miller et al. | 33/767 |

Primary Examiner—William A. Cuchlinski, Jr.
Assistant Examiner—Patrick R. Scanlon
Attorney, Agent, or Firm—Ned Conley; David Rose; Donald Verplancken

[57] ABSTRACT

The tape measure includes a lock for locking the tape in an extended position from its case. The lock includes a toggle pivotably mounted on the case and a lock shoe extending from one end of the toggle to a position adjacent the tape. The case includes guides, such that when the toggle is depressed, the lock shoe is forced against the tape so as to wedge the tape between the lock shoe and the case to prevent its retraction.

15 Claims, 3 Drawing Sheets

TAPE MEASURE LOCK

BACKGROUND OF THE INVENTION

The present invention relates to the field of tape measures and more particularly to locks used to prevent retraction of the retractable tapes used in tape measures.

A tape measure typically includes a case, a metal tape retractably mounted within the case, a retraction means for retracting the tape, a stop for preventing the end of the tape from retracting into the case, a clip to attach the tape measure to clothing, such as a belt, and a lock which releasably secures the tape in an extended position. A common prior art lock includes a toggle switch and a lock shoe attached to the toggle switch, such that when one end of the toggle is depressed, the lock shoe is moved against the tape which is in turn forced against the inside bottom of the case. Pushing the other end of the toggle releases the lock shoe, allowing the tape to freely retract into the case.

Prior art tape measures employ lock shoes in several configurations. In one such configuration, the lock shoe is a substantially straight finger, which is connected to the toggle by a radial arm. The finger, or lock shoe, is held between the side of the case, which is angled inward, and the side of the tape rolled within the case. When the toggle is depressed, it swings the end of the shoe connected to the radial arm inward with respect to the side of the case, and the opposite end of the shoe is swung outward with respect to the case. Because the ends of the shoe, which is a constant length, swing through an arc, the ends travel laterally with respect to the case bottom. Thus, as the toggle is pushed into the case, the shoe tends to depress the tape against the inner case bottom, eventually wedging the tape with sufficient force to overcome the spring force tending to retract the tape into the case, thereby locking the tape in place. However, this construction requires that the case be angled outward between the toggle and case bottom to form a fulcrum for the lever of the shoe, and the toggle end of the shoe must be outside the envelope of the tape coiled in the case. The shoe engages the tape directly below the toggle pivots, and the plane intersecting the toggle pivots and the shoe adjacent the lock shoe is substantially perpendicular to the case bottom. Because the lock shoe adjacent the tape and the toggle pivot define a plane perpendicular the base, and the plane must be disposed outside the diameter of the coiled tape within the case, the case bottom must be longer than the diameter of the tape coiled within the case. Therefore, the bottom of the case must be longer than the width of the case at the fulcrum point. Therefore, in this construction the case bottom is commonly substantially longer than the coiled tape width.

In another prior art tape measure, the toggle is mounted on the front wall of the case adjacent a vertical shoe guide in the sides of the case. The sides of the shoe fit within the shoe guides in each side of the case, such that the entire shoe is restricted to vertical travel. The toggle has a curled bisected finger which forms a T-slot receptacle in which a mating T-slot on the shoe is engaged. The radius of the curl is sized to cause the shoe to move vertically in the vertical restricting shoe guides in the sides of the case as the toggle is pivoted. The toggle includes a pair of recesses in the bisected finger portion which act as lock recesses when the toggle is fully depressed to cause the lock shoe to engage the tape. Because the entire lock shoe slides vertically in the shoe guides and is located on the front of the case, the shoe must engage the tape outward the diameter of the tape coiled within the case. This limitation requires the bottom of the case to be substantially longer than the diameter of the coiled tape. In a 300-foot tape measure, the interior of the case defines a 2.75 to 3.00-inch chamber to store the retracted tape. Therefore, these tape measures are typically 3.50 inches long. U.S. Pat. No. 3,578,259 describes a lock system having this construction.

In U.S. Pat. No. 4,527,334, another lock system is disclosed, wherein the tape is attached to a circular housing, and the circular housing is in turn releasably engageable with the lock. In this configuration, the lock has an arm which releasably engages the circular housing on the perimeter of the housing. The lock incorporates a metal coiled spring to assist in biasing the lock against the housing to maintain engagement contact.

U.S. Pat. No. 4,479,617 discloses a lock wherein a reciprocating locking plate has cams which are actuated by the toggle. The toggle has a swing type radial arm which engages the cam, and the toggle motion of engaging and disengaging the toggle causes lateral motion in the locking plate. The locking plate, in turn, pinches the tape against the case bottom to lock the tape in position.

One deficiency of prior art tape measures having the shoe lock the tape against the case bottom, is that the bottom of the case must be long enough to accommodate the lock shoe and associated lateral travel of the lock shoe. Further, in certain devices, toggle and vertically restrained shoe must be located outside the coil of the tape. Therefore, the total length of the case bottom must equal the diameter of the tape plus the arc length of travel of the end of the lock shoe in response to movement induced at its other end by the toggle, or, the width of the shoe and guide wall. A prior art toggle mounting system may commonly require ½ inch of space which must be added to the bottom of the case.

The present invention overcomes these deficiencies of the prior art.

SUMMARY OF THE INVENTION

The present invention includes a toggle, pivotably mounted on the case, which engages a lock shoe extending from one end of the toggle into the case with its free end positioned adjacent the tape. The case includes guides which mate with alignment pins on the lock shoe to guide the lock shoe within the case. Using the guide and pin system of the present invention, the fulcrum of the arc of the engaging lock shoe moves within the guides, thereby eliminating much of the case bottom length in excess of the tape coil diameter required by the lock systems of the prior art. The lock shoe thus normally engages the tape, although slight arcuate travel is present.

Other objects and advantages of the invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
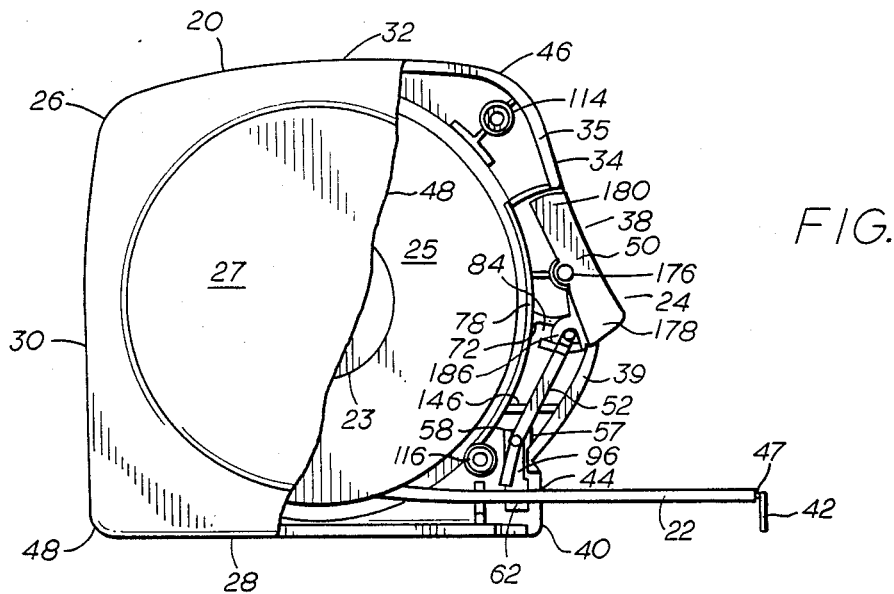
FIG. 1 is a partial cutaway view of the tape measure with the lock of the present invention.

Referring initially to FIGS. 1 through 5, the tape measure of the present invention includes a case 20, a metal tape blade 22 retractably mounted within the case 20, a tape retraction means 23 for retracting the tape 22 into the case 20, and a locking means 24 for locking the tape 22 in an extended position from the case 20. The tape retraction means 23 applies a retracting force whenever the tape 22 is pulled out of the case 20. To prevent the tape 22 from retracting during use, the locking means 24 overcomes the retracting force of the tape retraction means 23 such that that portion of the tape 22 extending from the case 20 may be locked in place so that the user will not have to hold the tape in an extended position. This frees the user while taking measurements.

The case 20 of the present invention is configured and dimensioned to house the tape retraction means 23, the coiled tape blade 22, and the locking means 24. Thus, the case 20 is made of molded plastic and includes two case halves 46, 48 which, upon assembly, form generally flat sides 25, 27 and a configured peripheral edge 26. Case sides 46, 48 each have mounting risers 114, 116, 118, 120, 122, 124, 126, and 128 projecting from case walls 25, 27. Risers 114–120 have sleeves therein to guide mounting screws (partially shown in views 3 and 5), and have countersinks at the intersection of the sleeve and the outer case wall (not shown). Risers 122–128 are threaded to receive mounting screws (not shown), and have alignment bosses 130–136 which are sized to mate within boss recesses 138–144 in risers 114–120 for assembly of the case sides 25, 27.

The peripheral edge 26 of the case 20 includes a flat bottom 28 and an upwardly projecting flat backside 30 which extends into an arcuate portion 32 which forms the top peripheral edge of the case 20. The arcuate portion 32 terminates in an angled frontal portion 34 adjacent to which is housed the locking means 24. The angled frontal portion 34 includes an upwardly facing flat portion 35 having an aperture 38 for housing a toggle 50 as hereinafter described, and a lower straight portion 39 having a tape slot 44 located in the lower straight portion 39 at the juncture of the angled frontal portion 34 and the flat bottom side 28.

Case half 46 further has mounting pin 148 which protrudes from case wall 27 near the center of case wall 27 and has a slot 150 therethrough over most of its length. A coaxial alignment slot 152 is located at the end of the pin and mates with an aperture 154 having a spine 156 located therein found in case wall 27.

The tape retraction means 23 (not shown in detail) may be one of several designs well known in the art. The tape retraction means 23 is constructed to retract the tape blade 22 into case 20 for convenient storage. Most tape measures use a spring retraction system, as the tape retraction means 23, to retract the tape. U.S. Pat. Nos. 3,578,259; 4,479,617; and 4,527,334 generally describe such a retraction system. However, the present invention may be employed with other retraction systems. Typically the interior end of the tape blade 22 is attached to one end of a spring coiled about the center 41 of the case 20. As the tape blade 22 is withdrawn through tape slot 44, the spring is coiled tightly whereby upon the release of the tape, the coil expands to retract the tape blade 22 back into the case 20. The case includes a conformable bumper 40, disposed below tape slot 44 to absorb the energy of the tape stop 42 as the tape 22 is withdrawn in the case 20. U.S. Pat. No. 4,479,617 generally discloses the construction of the bumper 40. Case size is generally dependent upon the coiled tape diameter 45, which diameter defines the space within which the tape 22 resides when coiled within case 20. The coil of tape is bounded by the peripheral edge 26 of the case 20, arcuate tape guides 29, 31, 33, 43, 49, 55 and an arcuate tape shield wall 78 extending from each side 25, 27 of the case interior of the angled frontal portion 34. Tape shield wall is disposed opposite upwardly projecting backside 30 to define coiled tape diameter 45.

The tape blade 22 includes a stop 42. The stop 42 is a generally right-angled piece of metal preferably riveted to the end of the tape blade 22. The tape slot 44 is dimensioned in cross-section to receive the tape blade 22, but small enough to prevent the metal stop 42 from passing therethrough thereby preventing the complete retraction of the tape blade 22 into the case 20. As the tape retraction means 23 retracts the tape blade 22 into the case 20, the stop 42 engages the bumper 40 adjacent the peripheral edge 26 of the case 20 around the tape slot 44 to prevent the end 47 of the tape blade 22 from completely withdrawing into the case 20 through slot 44.

Figure 2:
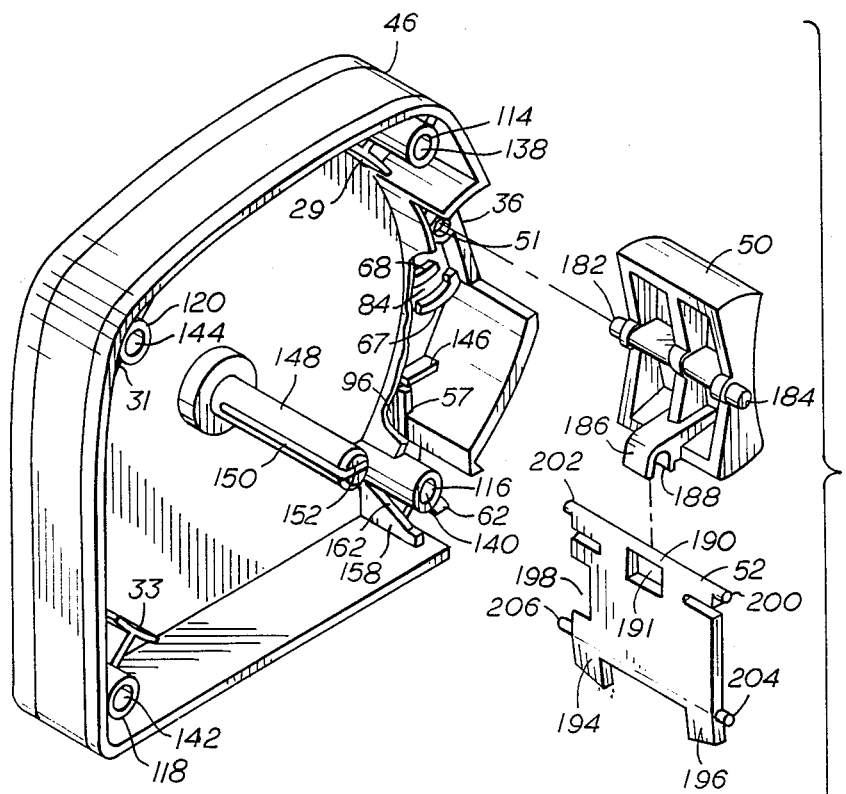
FIG. 2 is a perspective exploded view of one case half configured for the lock of the present invention in partial cutaway showing the alignment of the toggle and lock shoe.
Figure 3:
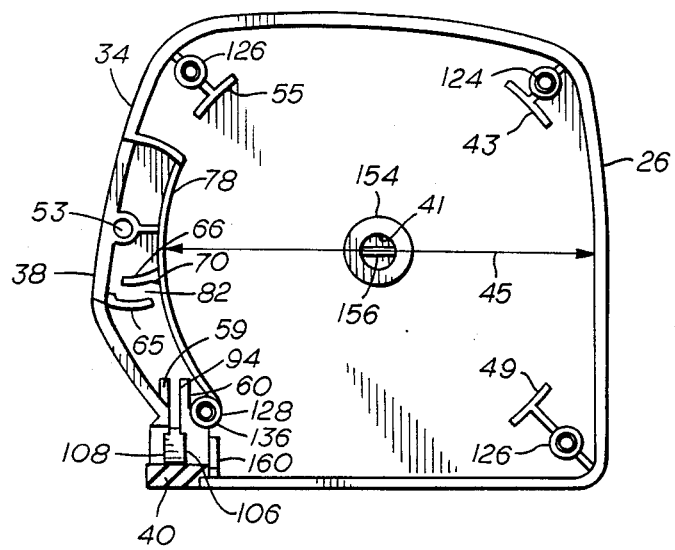
FIG. 3 is a partial cutaway side view of case.

Locking means 24 includes the toggle 50 and shoe 52 together with the guide means on the case 20 for guiding the shoe 52 as it moves within the case 20 upon the pivoting movement of the toggle 50. The shoe 52 is rotatably attached to the toggle 50 by means of a pivot arm 186 projecting from the underside of one end of the toggle 50. The pivot arm 186 is generally U-shaped to form a pivot recess 188 sized to receive a bearing shaft 190 extending across the upper end of the shoe 52. As best shown in FIG. 2, the upper end of the shoe 52 includes an aperture 191 to permit the pivot arm 186 of the toggle 50 to rotate about the bearing shaft 190 of the shoe 52.

Toggle 50 is generally rectangular and dimensioned to fit in aperture 38 of case 20. Aperture 38 is formed by rectangular cut-outs 36, 37 in case halves 46, 48. Toggle 50 includes upper and lower arcuate surfaces about a narrow mid-portion forming pivot 176 for the toggle 50. The enlarged end portions form an on-flat 178 and off-flat 180. The thickness of on and off-flats 178, 180 are dimensioned to be received within case aperture 38 whereby upon depression of one of flats 178, 180 of the toggle 50, the surface of the flat is substantially flush with the surface of peripheral edge 26. The opposite flat then protrudes out of the case for engagement. Toggle 50 further includes cylindrical pins 182, 184 which fit within toggle pivot recesses 51, 53 located adjacent frontal portion 34 substantially centered on toggle cutouts 36, 37 of the case 20. The pins 182, 184 rotate within recesses 51, 53 to allow toggle 50 to pivot within aperture 38 of case 20. The toggle 50 is located adjacent the coiled tape 22 within case 20, and recesses 51, 53 are located outward from tape shield wall 78 a distance sufficient to allow the on-flat 178 and off-flat 180 to be fully depressed into case 20. This requires recesses 51, 53 to be located outward a tangent of the tape shield wall perpendicular the case bottom.

Shoe 52 has a generally rectangular-shaped body 192 with upper guide pins 200, 202 formed by the ends of bearing shaft 190 and lower guide pins 204, 206 projecting from each side of shoe 52. These guide means are reciprocably disposed within guide means disposed in the case 20. The guide means of case 20 includes opposed upper guide slots 82, 84 and opposed lower guide slots 94, 96. Upper guide pins 200, 202 are received within upper guide slots 82, 84, and lower guide pins 204, 206 are received within lower guide slots 94, 96, for guiding the lock shoe 52 into engagement with the tape 22 as will be further described herein.

Upper guide slots 82, 84 are formed on case sides 27, 25, respectively, and are bounded by upper arcuate walls 66, 68 and lower arcuate walls 65, 67. Upper arcuate walls 66, 68 extend arcuately from tape shield wall, and lower arcuate walls 65, 67 extend arcuately from flat portion 35. Lower arcuate walls 65, 67 and upper arcuate walls 66, 68 do not entirely span the distance between tape shield wall 78 and flat portion 35. Upper arcuate walls 66, 68 also include locking recess 70, 72 adjacent the intersection of upper arcuate walls 66, 68 and tape shield wall 78.

Upper guide pins 200, 202 of the shoe 52 are received within upper guide slots 82, 84 for sliding movement therewithin. Spring cutouts 201, 203 are provided in shoe 52 adjacent upper guide pins 200, 202 to allow guide pins 200, 202 to slightly deform upon engagement of the shoe 52 against the tape 22 as is hereinafter described.

Lower guide slots 94, 96 are substantially normal to case flat bottom 28 and formed on case walls 25, 27, respectively, and are bounded by inner guide walls 58, 60, outer guide walls 57, 59 opposed thereto, and engagement arms 62, 64 located at the lower terminus of lower guide slots 94, 96. Inner and outer guide walls 57, 58, 59, and 60 are dimensioned to receive lower guide pins 204, 206 and to allow the pins 204, 206 to travel vertically in slots 94, 96 in response to actuation of toggle 50. Thus, when off-flat 180 is depressed, lower guide pins 204, 206 withdraw inward the case 20 away from flat bottom portion 28, and inner outer guide walls 57, 58, 59, 60 are dimensioned to prevent lower guide pins from withdrawing from lower guide slots 94, 96.

The shoe 52 further includes a generally rectangular cut-out in one side to form an alignment slot 198. Upon assembly, the alignment slot 198 receives an alignment web 146 molded in case half 46 between upper guide slot 82 and the lower guide slot 94. The height of alignment web 146 is slightly less than the depth of alignment slot 198 and height of guide pins 200, 204.

Engagement tangs 194, 196 and engagement arms 62, 64 are disposed on shoe 52 and case 20, respectively, for gripping the tape 22 therebetween. Engagement arms 62, 64 are generally rectangular in cross-section, and protrude from walls 25, 27 of case halves 46, 48. Arms 62, 64 have tapered bottoms 98, 100, tapered sides 102, 104, 106 and 108, and upper engagement flats 110, 112. Bottoms 98, 100 are substantially parallel to case bottom 28, and upper engagement flats 110, 112 are disposed at an angle thereto to substantially match the engagement tangs 194, 196 of the shoe 52.

Symmetrical-spaced engagement tangs 194, 196 are located on the base of shoe 52 and project therefrom. Tang outer walls 218, 220 are continuations of shoe walls 208, 210. Tang inner walls 222, 224 project normally from shoe base 216. Engagement flats 226, 228 are disposed between tang outer walls 218, 222 and inner walls 222, 224 and are symmetrically angularly disposed thereto by engagement of tang angle 230. Engagement tang angle 230 is sized to be substantially equal to the angle of the engagement arms 62, 64 to case walls 25, 27 so that tape 22 may be pinched between engagement arms 62, 64 and engagement tangs 194, 196 to prevent retraction of tape 22 into case 20.

Figure 4:
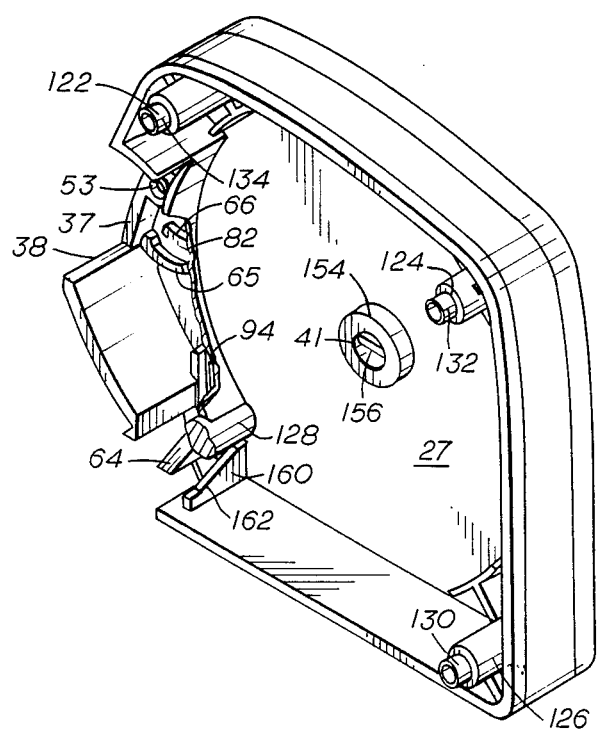
FIG. 4 is a perspective view of the other case half configured for the lock of the present invention in partial cutaway.
Figure 5:
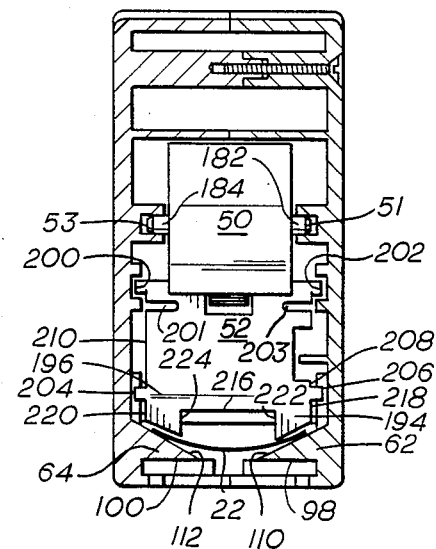
FIG. 5 is a front view of the lock including the toggle and lock shoe located in the case shown in a partial cutaway view.

Case halves 46, 48 further have tape alignment bosses 158, 160 located on case bottom 28. As best shown in FIGS. 2 and 4, each alignment boss 158, 160 is a thin web substantially normal to case bottom 28 having an angled top 162. Alignment bosses 158, 160 help align tape 22 to conform to the engagement tangs 194, 196 and engagement arms 62, 64.

Upon assembly of case halves 46, 48, upper guide slots 82, 84, lower guide slots 94, 96, toggle pivot recesses 50, 52 and engagement arms 62, 64 are disposed in alignment across the gap between sides 25, 27.

Figure 6:
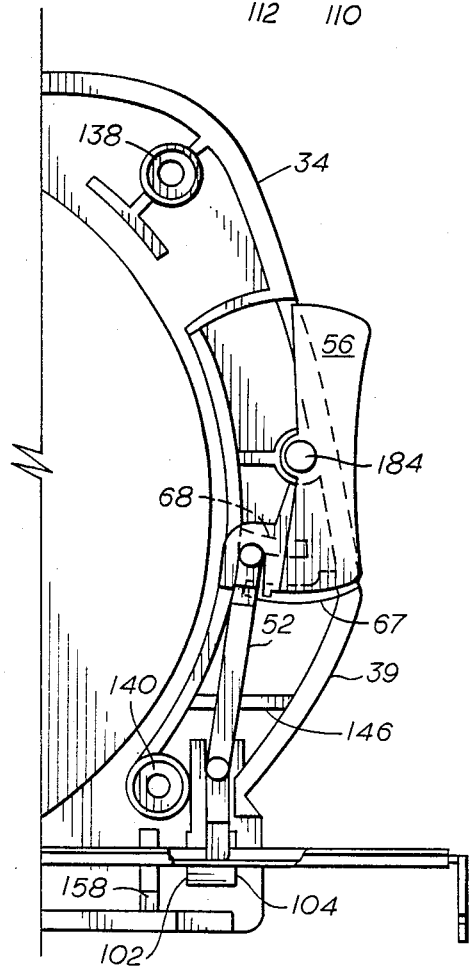
FIG. 6 is a partial view of the case demonstrating the travel of the lock shoe within the case guides in the engaged position.
Figure 7:
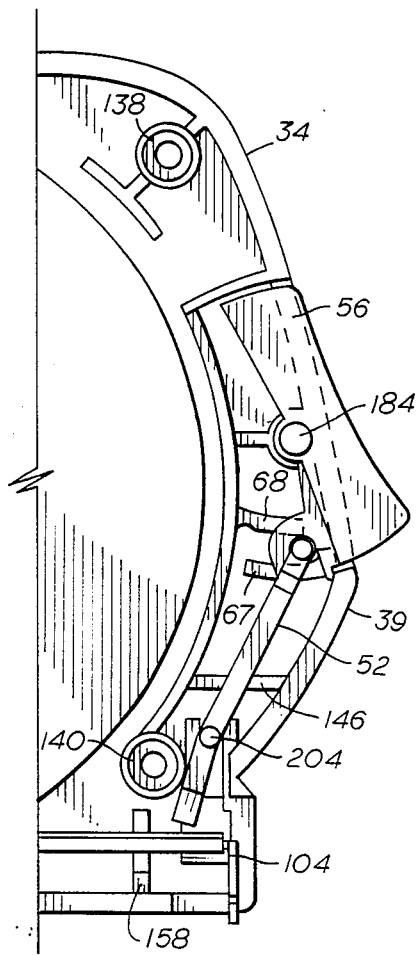
FIG. 7 is a partial view of the case demonstrating the travel of the lock shoe within the case guides in the unengaged position.

Referring now to FIGS. 6 and 7, movement of the toggle 50 about pivot 176 causes arcuate movement of upper pins 200, 202 in upper guide slots 82, 84 (only one slot shown in this view) causing vertical movement of lower pins in lower guide slots 94, 96 (only one slot shown in this view). Travel of lower pins in guide slots 94, 96 causes vertical travel of the lock shoe 52 adjacent lower pins 204, 206, thereby forcing engagement tangs 194, 196 into tape 22 against engagement arms 62, 64 thereby pinching the tape 22 and preventing tape 22 from retracting into the case. During lock shoe travel, lock shoe 52 is pivoted about lower pins 204, 206, causing engagement tangs 194, 196 to engage in an arc against the engagement arms 62, 64. Toggle 50, shoe 52, and case 20 are sized such that engagement of shoe 52 against tape 22 occurs prior to complete toggle travel, causing shoe 52 to bend or compress. Pins 200, 202 deform slightly into spring cut-outs 201, 203 during lock shoe 52 travel and engagement with locking recesses 70, 72. Upon full toggle travel, this compression is relaxed by movement of upper pins 200, 202 into locking recesses 70, 72 which forms a lock to keep shoe 52 engaged against tape 22. Depressing off-flat 180 causes shoe 52 to retract away from tape thereby allowing tape 22 to retract into case 20. The configuration of the guide slots 82, 84, 94, 96 within the case 20 with respect to the toggle pivot recesses 51, 53 and engagement arms 62, 64 permits the end of lock shoe 52 adjacent toggle 50 to engage outward the case 20 while the opposed end of the shoe adjacent the lower pins 204, 206 moves vertically in the lower guide slots. The lower guide slots 94, 96 are not directly beneath the toggle pivot recesses 51, 53, but inward the case with respect to a plane perpendicular the case bottom 28 and intersecting the center of the toggle pivot recesses. Thus, unlike the prior art, the plane defined by the pivot recesses 51, 53 and lower guide pins 94, 96 is not perpendicular the case bottom 28. Rather, lock shoe 52 engages the tape 22 at a point inward the case 20 with respect to pivot recesses 51, 53.

Therefore, although the toggle 50 is mounted outward the coiled tape diameter, the case bottom 28 is substantially equal to the coiled tape diameter 45.

While a preferred embodiment of the invention has been shown and described, modifications thereof can be made by one skilled in the art without deviating from the spirit of the invention.

I claim:

1. A tape measure, comprising;

a case for retractably mounting a tape;

a toggle having opposed toggle pins for pivotal engagement within said case and at least one slotted arm projecting from one end of said toggle;

a shoe rotatably disposed on said slotted arm, said shoe having engagement tangs for engaging said tape and first and second pairs of opposed pins projecting from said shoe;

said case having a tape slot for extending said tape, pivot recessed receiving said opposed toggle pins, opposed arcuate guides adjacent said toggle, and vertical guides adjacent said tape slot;

opposed engagement arms protruding from the inner sides of the case; and said first pair of opposed pins sliding within said arcuate guides and said second pair of opposed pins sliding within said vertical guides whereby said guides guide said shoe into engagement with said tape to clamp said tape between said engagement tangs and engagement arms in response to actuation of said toggle about said toggle pins.

2. The lock of claim 1, wherein said first pair of opposed pins engage lock recesses in said arcuate guides for locking said shoe into engagement with said tape.

3. A tape measure, comprising;

a case having a tape adapted for having one end projecting outward from within said case through a slot therein;

retraction means for retracting said tape into said case;

a toggle pivotably mounted within said case;

a lock shoe rotatably disposed on one end of said toggle and extending through said case to a location adjacent the tape, said lock shoe having first and second pairs of opposed pins;

whereby upon depressing one end of said toggle, said lock shoe moves against said tape with a force sufficient to prevent said retraction means from retracting said tape into said case and upon depressing the other end of said toggle, said lock shoe moves away from said tape;

said case having first and second pairs of guide slots disposed therein engaging said first and second opposed pins for guiding said lock shoe against said tape.

4. The tape measure of claim 3, wherein said first pair of guide slots are opposed arcuate slots.

5. The tape measure of claim 4, wherein said second pair of guide slots are opposed vertical slots.

6. The tape measure of claim 5, wherein said arcuate slots have lock recesses sized to accept said first pair of pins whereby upon depression of said toggle inward of said case causing said lock shoe to engage said tape, said first pair of pins interferingly engages said lock recesses thereby preventing said lock shoe from retracting from said tape.

7. A tape measure, comprising;

a case;

a tape adapted for having one end extending outward from said case through an aperture therein and having a stop to prevent retraction of said end into said case;

retraction means for retracting said tape into said case;

a pivoting lock for selectively locking portions of said tape into an extended position from said case, having opposed guide means in said case for guiding a portion of said lock into locking engagement with said tape and a pivot means in said case for mounting said lock in said case;

said lock further comprising a toggle with opposed pivot pins which engage said pivot means and a lock finger projecting from one end of said toggle;

a lock shoe, being generally rectangular in shape, having a lock finger receptacle for engaging said lock finger at one end, engagement tangs at its opposed end, and two pairs of guide pins disposed on its sides for engagement with said guide means in said case whereby upon depressing one end of said toggle, said lock shoe moves into engagement against said tape with a force sufficient to prevent said retraction means from causing said tape to retract into said case and upon depressing the other end of said tape, said lock shoe moves away from said tape;

wherein said guide means includes opposed arcuate guide slots adjacent said pivot means and opposed vertical guides adjacent said aperture whereby the arcuate motion of said toggle causes one of said pairs of guide pins on said lock shoe to arcuately move within said arcuate guide slots causing the other pair of opposed guide pins to move laterally in said vertical guides thereby moving said engagement tangs into engagement with said tape.

8. The tape measure of claim 7, wherein said arcuate guide slots include lock pin recesses whereby movement of said toggle to engage said lock causes said pair of pins in said arcuate guide slots to engage said lock pin recesses thereby preventing said retraction means from retracting said tape into said case until said toggle is depressed to move said lock away from said tape.

9. The tape measure of claim 8, wherein said case includes an alignment protrusion located in one side of said case between said arcuate and vertical guides, and said lock shoe has an alignment cut-out therein, whereby upon assembly, said alignment protrusion fits within said alignment cut-out.

10. A tape measure, comprising:

a case having a base and a tape adapted for one end extending outward from within said case through an aperture therein and having a stop attached thereto to prevent retraction of said tape into said case and two pairs of guide means;

tape retraction means for retracting said tape into said case;

opposed projecting members disposed above said base case and adjacent said aperture;

a toggle pivotably mounted in pivot recesses located within said case;

said projecting members further disposed inward said case with respect to a plane perpendicular to said base and intersecting said pivot recesses;

a lock shoe attached to said toggle and extending into said case to a location adjacent said tape to pinch said tape against said projection members with a force sufficient to prevent said retraction means from retracting said tape into said case;

wherein said lock shoe includes opposed pins which are engaged by said guide means and the first of said pairs of guide means are opposed arcuate slots.

11. The tape measure of claim 10, wherein the second of said pairs of guide slots are opposed vertical slots.

12. The tape measure of claim 11, wherein said arcuate slots have lock recesses sized to accept said pins, and said lock shoe and toggle are sized whereby upon depression of said toggle inward said case to engage said lock shoe against said tape, one pair of said pins interferingly engages said lock recesses thereby preventing said retraction means from retracting said tape into said case.

13. A tape measure comprising,
a case having a base and a tape adapted for one end extending outward from within said case through an aperture therein and having a stop attached thereto to prevent retraction of said tape into said case;
tape retraction means for retracting said tape into said case;
a case retraction chamber for housing said tape retraction means;
a projection member located coplanar with a plane which is tangent to said case retraction chamber and perpendicular to the base of said case;
a toggle pivotably mounted within said case;
a lock shoe rotatably attached to said toggle and extending into said case to a location adjacent said tape to pinch said tape against said projection member with a force sufficient to prevent said retraction means from retracting said tape into said case,
wherein said lock shoe has opposed pins and said case includes two pairs of guide means to engage said pins to arcuately guide said lock shoe into engagement with said tape;
wherein the first of said pairs of guide means are opposed arcuate slots.

14. The tape measure of claim 13, wherein the second of said pairs of guide means are opposed vertical slots.

15. The tape measure of claim 14, wherein said arcuate slots have lock recesses sized to accept said lock shoe pins, and said lock shoe and toggle are sized whereby upon depression of said toggle inward said case to engage said lock shoe against said tape, one pair of said pins interferingly engages said lock recesses thereby preventing said lock shoe from retracting from said tape.

* * * * *

UNITED STATES PATENT AND TRADEMARK OFFICE
CERTIFICATE OF CORRECTION

PATENT NO. : 4,976,048
DATED : December 11, 1990
INVENTOR(S) : William C. Blackman It is certified that error appears in the above—identified patent and that said Letters Patent is hereby corrected as shown below:

Column 7, line 19, Claim 1, change "recessed" to --recesses--.

Column 8, line 60, Claim 10, after "base" delete --case--.

Signed and Sealed this

Twenty-ninth Day of September, 1992

Attest:

DOUGLAS B. COMER

*Attesting Officer*   Acting Commissioner of Patents and Trademarks